(12) United States Patent
Yada et al.

(10) Patent No.: US 9,012,084 B2
(45) Date of Patent: Apr. 21, 2015

(54) SECONDARY BATTERY

(75) Inventors: Chihiro Yada, Susono (JP); Kazuto Ide, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/990,200

(22) PCT Filed: Dec. 16, 2011

(86) PCT No.: PCT/IB2011/003061
§ 371 (c)(1),
(2), (4) Date: May 29, 2013

(87) PCT Pub. No.: WO2012/080826
PCT Pub. Date: Jun. 21, 2012

(65) Prior Publication Data
US 2013/0260250 A1 Oct. 3, 2013

(30) Foreign Application Priority Data

Dec. 17, 2010 (JP) .................................. 2010-281845
Dec. 1, 2011 (JP) .................................. 2011-263551

(51) Int. Cl.
*H01G 11/50* (2013.01)
*H01M 4/485* (2010.01)
*H01M 4/131* (2010.01)
(Continued)

(52) U.S. Cl.
CPC ............... *H01M 4/485* (2013.01); *H01G 11/50* (2013.01); *H01M 4/0471* (2013.01); *H01M 4/131* (2013.01); *H01M 4/505* (2013.01); *H01M 4/525* (2013.01); *H01M 4/62* (2013.01); *H01M 10/052* (2013.01); *H01M 10/0562* (2013.01); *H01M 2300/0071* (2013.01); *Y02E 60/122* (2013.01); *Y02E 60/13* (2013.01)

(58) Field of Classification Search
CPC ..... Y20E 60/12; Y20E 60/122; Y20E 60/528; H01M 10/0525; H01M 2/1686; H01M 2/166; H01M 2/1673; H01M 10/0565; H01M 4/13
USPC .................. 429/223, 209, 224, 231.5, 231.95
See application file for complete search history.

(56) References Cited

U.S. PATENT DOCUMENTS 8,652,686 B2 * 2/2014 Visco et al. ............... 429/231.95
2002/0018936 A1 * 2/2002 Suzuki et al. ................. 429/247
(Continued)

FOREIGN PATENT DOCUMENTS

CN 1322021 A 11/2001
CN 101388470 A 3/2009
(Continued)

*Primary Examiner* — Cynthia H Kelly
*Assistant Examiner* — Monique Wills
(74) *Attorney, Agent, or Firm* — Oliff PLC

(57) ABSTRACT

A secondary battery is provided with a positive electrode active material layer a containing a positive electrode active material, a negative electrode active material layer containing a negative electrode active material, an electrolyte layer formed between the positive electrode active material layer and the negative electrode active material layer, and a modification material disposed at an interface between an electrolyte material and at least one electrode active material among the positive electrode active material and the negative electrode active material, and having a higher relative permittivity than the relative permittivity of the electrolyte material.

14 Claims, 7 Drawing Sheets

(51) Int. Cl.
  *H01M 4/62*     (2006.01)
  *H01M 10/052*   (2010.01)
  *H01M 4/04*         (2006.01)
  *H01M 4/505*        (2010.01)
  *H01M 4/525*        (2010.01)
  *H01M 10/0562*  (2010.01)

(56) References Cited

U.S. PATENT DOCUMENTS

| | | | |
|---|---|---|---|
| 2007/0172739 A1 | 7/2007 | Visco et al. | |
| 2009/0068563 A1 | 3/2009 | Kanda et al. | |
| 2009/0197177 A1 | 8/2009 | Teramoto | |
| 2009/0197183 A1 | 8/2009 | Kato | |
| 2010/0279176 A1* | 11/2010 | Ogawa et al. | 429/304 |
| 2010/0310940 A1 | 12/2010 | Kim et al. | |
| 2012/0052396 A1 | 3/2012 | Tsuchida et al. | |
| 2013/0337312 A1* | 12/2013 | Park et al. | 429/145 |

FOREIGN PATENT DOCUMENTS

| | | |
|---|---|---|
| JP | A-2001-283861 | 10/2001 |
| JP | A-2002-042862 | 2/2002 |
| JP | A-2007-005279 | 1/2007 |
| JP | A-2009-152077 | 7/2009 |
| JP | A-2009-181877 | 8/2009 |
| JP | A-2009-193803 | 8/2009 |
| JP | A-2009-206084 | 9/2009 |
| JP | A-2010-034006 | 2/2010 |
| JP | A-2010-135090 | 6/2010 |
| JP | A-2011-519142 | 6/2011 |
| WO | WO 2009/101506 A1 | 8/2009 |
| WO | WO 2010/053222 A1 | 5/2010 |

* cited by examiner

F I G. 4A
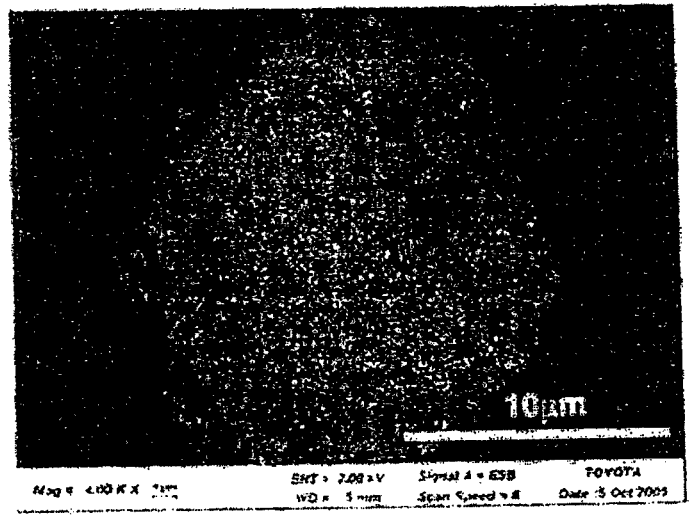
F I G. 4B
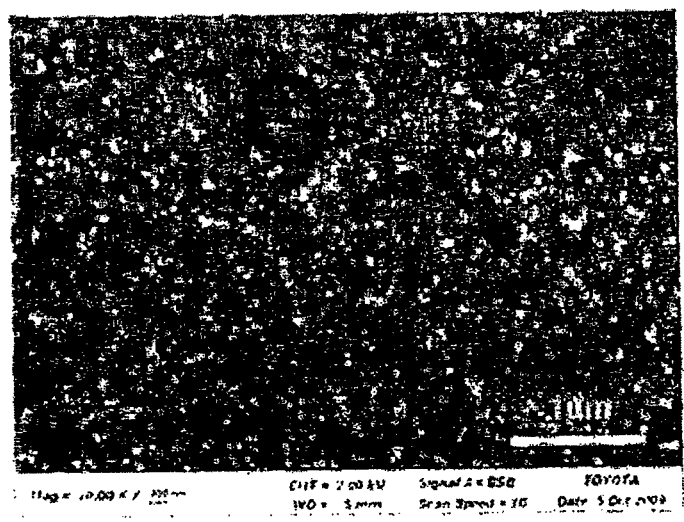

[COMPARATIVE EXAMPLE 1]

[EXAMPLE 1]

[EXAMPLE 2]

[EXAMPLE 3]

[EXAMPLE 4]

SECONDARY BATTERY

BACKGROUND OF THE INVENTION

1. Field of the Invention

The invention relates to a secondary battery in which interface resistance is decreased.

2. Description of Related Art

With the rapid spread in recent years of information-related equipment, communication equipment, and the like, such as personal computers, video cameras and mobile phones, emphasis is placed on the development of batteries used as power sources therefor. In addition, development of high output and high capacity battery for electric vehicles or for hybrid vehicles is also moving forward in the world of automotive industry, or the like. Currently, among a variety of batteries, lithium secondary batteries are drawing attention from the point of view of high energy density.

In the field of such lithium secondary batteries, a variety of studies are being conducted in order to reduce the interface resistance between active materials and electrolytes. For instance, an all-solid-state lithium secondary battery is described in Japanese Patent Application Publication No. 2009-193803 (JP-A-2009-193803), having, between a negative electrode layer and a sulfidic solid electrolyte layer, a Li ion conductor-modification layer that is electrochemically stable and has no electron conductivity, against the negative electrode layer. This is intended to improve the output by suppressing the formation of a space-charge layer at the interface on the negative electrode layer side of the sulfidic solid electrolyte layer thereby decreasing resistance against lithium ion conduction.

In addition, Japanese Patent Application Publication No. 2002-042862 (JP-A-2002-042862) describes a lithium battery that is impregnated between active material particles and oxidic inorganic solid electrolyte particles with sulfolane, which is a solvent having high permittivity and excellent ion conductivity, or at least one among derivatives thereof. Further, Japanese Patent Application Publication No. 2007-005279 (JP-A-2007-005279) describes a layered body for an all-solid-state lithium secondary battery containing an active material layer and a solid electrolyte layer joined to the active material layer by sintering, the layered body having no component other than the constituents of the active material layer and the constituents of the solid electrolyte layer detected when analyzed by the X-ray diffraction method, as well as an all-solid-state lithium secondary battery using such a layered body.

In the secondary batteries of the related arts described above, as the interface resistance between the electrode active material and the electrolyte material is large, the capacity sometimes drops noticeably charged-discharged at high rates.

SUMMARY OF THE INVENTION

The invention provides a secondary battery in which the interface resistance is decreased. A first aspect of the invention relates to a secondary battery having a positive electrode active material layer containing a positive electrode active material, a negative electrode active material layer containing a negative electrode active material and an electrolyte layer formed between the positive electrode active material layer and the negative electrode active material layer. The secondary battery is provided with a modification material that is disposed at an interface between an electrolyte material and at least one electrode active material among the positive electrode active material and the negative electrode active material, and having a higher relative permittivity than the relative permittivity of the electrolyte material.

According to the above aspect, disposing at the interface between the electrode active material and the electrolyte material a modification material having a higher relative permittivity than the relative permittivity of the electrolyte material allows a secondary battery to have a decreased interface resistance between the electrode active material and the electrolyte material. This allows a high capacity to be obtained even when charging-discharging at a high rate.

In the above aspect, the modification material may be a solid. According to the aspect, since the fluidity of a solid is extremely low, the modification material, with no movement, can be disposed more definitely at the interface between the electrode active material and the electrolyte material.

In the above aspect, the modification material may be an oxide. According to the aspect, the modification material can be stable in the atmosphere.

In the above aspect, the modification material may be $BaTiO_3$. The reason is that the relative permittivity of $BaTiO_3$ is high.

In the above aspect, the modification material may be at least one of $Li_2B_4O_7$, $LiTaO_3$ and $LiNbO_3$. The reason is that the relative permittivity is high.

In the above aspect, the electrolyte material may be a compound represented by the general formula $Li_{1+x}Al_xGe_{2-x}(PO_4)_3$ with x satisfying $0 \leq x \leq 2$.

In the above aspect, the electrode active material may be the positive electrode active material, and the positive electrode active material may be an oxide positive electrode active material containing Li, Ni and Mn.

In the above aspect, a weight ratio of the electrode active material to the modification material in the electrode active material layer may be within a range of 100/0.1 to 100/3. According to the aspect, the interface resistance can be decreased effectively.

In the above aspect, the weight ratio of the electrode active material to the modification material in the electrode active material layer may be within a range of 100/0.1 to 100/1. According to the aspect, interface resistance can be decreased further.

In the above aspect, a weight ratio of the modification material to the electrolyte material supported on the surface of the electrode active material in the electrode active material layer may be within a range of 0.1/5 to 3/5. According to the aspect, the interface resistance can be decreased effectively.

In the above aspect, the weight ratio of the modification material to the electrolyte material supported on the surface of the electrode active material in the electrode active material layer is within a range of 0.1/5 to 1/5. According to the aspect, interface resistance can be decreased further.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A and 4B are TEM photographs of a conjugated particle obtained in Example 1;

DETAILED DESCRIPTION OF EMBODIMENTS

Hereinafter, the secondary battery of the present embodiment will be described in detail.

The secondary battery of the embodiment is provided with a positive electrode active material layer containing a positive electrode active material, a negative electrode active material layer containing a negative electrode active material, an electrolyte layer formed between the positive electrode active material layer and the negative electrode active material layer, and a modification material disposed at an interface between the electrolyte material and at least one electrode active material among the positive electrode active material and the negative electrode active material, and having a higher relative permittivity than the relative permittivity of the electrolyte material.

Figure 1:
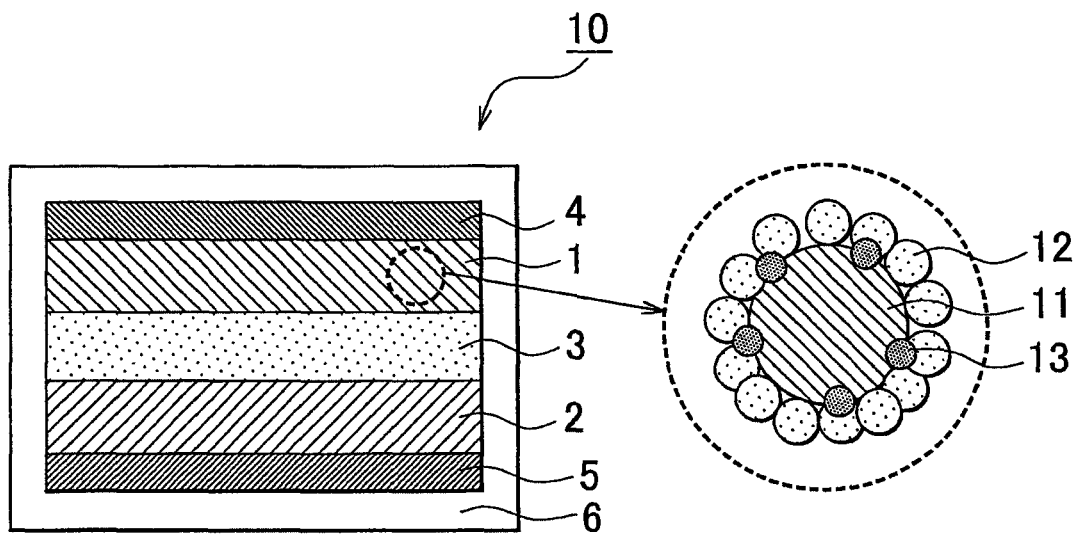
FIG. 1 is a simple cross-sectional view showing an example of secondary battery of the present embodiment.

FIG. 1 is a simple cross-sectional view showing an example of secondary battery of the present embodiment. A secondary battery 10 in FIG. 1 has a positive electrode active material layer 1, a negative electrode active material layer 2, an electrolyte layer 3 formed between the positive electrode active material layer 1 and the negative electrode active material layer 2, a positive electrode collector 4 carrying out current collection for the positive electrode active material layer 1, a negative electrode collector 5 carrying out current collection for the negative electrode active material layer 2, and a battery case 6 housing these members. In addition, the positive electrode active material layer 1 has a positive electrode active material 11, an electrolyte material 12, and a modification material 13 disposed at the interface between the positive electrode active material 11 and the electrolyte material 12. Here, the modification material 13 has a relative permittivity that is higher than the relative permittivity of the electrolyte material 12. In FIG. 1, the electrolyte material 12 and the modification material 13 are supported on the surface of the positive electrode active material 11, forming a conjugated particle. Although FIG. 1 illustrates a conjugated particle comprising the electrolyte material 12 and the modification material 13 supported on the surface of the positive electrode active material 11, in present embodiment, it suffices that the modification material is disposed at the interface between the electrode active material and the electrolyte material. For instance, a conjugated particle comprising a modification material supported on the surface of an electrode active material may be in contact with an electrolyte material contained in at least one among an electrode active material layer and a solid electrolyte layer, a conjugated particle comprising a modification material supported on the surface of an electrolyte material may be in contact with an electrode active material, or a modification material may be disposed between an electrode active material layer and a solid electrolyte layer. In addition, the type of the secondary battery of present embodiment is not limited in particular, and, for instance, pressed powder-type battery, sintered-type battery, thin film-type battery, and the like, can be cited.

According to the embodiment, disposing at the interface between the electrode active material and the electrolyte material a modification material having a higher relative permittivity than the relative permittivity of the electrolyte material allows a secondary battery to have a decreased interface resistance between the electrode active material and the electrolyte material. This allows a high capacity to be obtained even when charging-discharging at a high rate.

Here, although the mechanism whereby the modification material having a higher relative permittivity than the relative permittivity of the electrolyte material causes the interface resistance between the electrode active material and the electrolyte material to drop is still not determined, the following speculation is possible. That is to say, one cause is thought to be that disposing the material having a high relative permittivity at the interface between the electrode active material and the electrolyte material attenuates the extremely large electric field applied to the interface when charging-discharging, thereby suppressing the lattice distortion in the vicinity of the interface. Concretely, for instance, in the case of a lithium secondary battery having a positive electrode active material layer, a negative electrode active material layer, and an electrolyte layer formed between the positive electrode active material layer and the negative electrode active material layer, it is thought that, while Li ions move from the negative electrode active material layer towards the positive electrode active material layer at discharging time, since the interface resistance between the positive electrode active material layer and the electrolyte layer is high, Li ions build-up at the interface between both parties, provoking lattice distortion. As a result, hopping of Li ions to the positive electrode active material layer side becomes less likely to happen, increasing the interface resistance and causing the degree of Li ion conduction to drop. In contrast, disposing a material having a high relative permittivity such as $BaTiO_3$ at the interface between the positive electrode active material layer and the electrolyte layer is thought to allow the deposition and polarization of Li ions at the interface to be suppressed. Since dielectrics have the action of attenuating a gradient of electric potential, the presence of a dielectric at the interface is thought to be able to hinder the accumulation of Li ions at the interface, and the higher the relative permittivity of the dielectric, the smoother the movement of the Li ions at the interface can become.

In addition, the following mechanism can also be speculated. That is to say, disposing a material having a high relative permittivity at the interface between the electrode active material and the electrolyte material is thought to attenuate the extremely large electric field the interface is under during charging-discharging, allowing the formation of a carrier-deficient layer (for instance, a lithium-deficient layer) on the solid electrolyte material side of the interface to be suppressed. Generally, a large local electric field is thought to arise at the interface between the electrode active material and the solid electrolyte material due to the electric potential difference between the two, forming a carrier-deficient layer (for instance, a lithium-deficient layer; thickness: several nm to several μm) on the solid electrolyte material side. In such a carrier-deficient layer, the ion conductivity is though to be low due to the metal concentration within the material being off from the optimal composition, resulting in an increase in the interface resistance. Given that the larger the electric potential difference between the electrode active material and the solid electrolyte material, the more prominently such a carrier-deficient layer is generated, it is thought to become more prominent, for instance, when the average operating voltage of the positive electrode active material is high.

Meanwhile, when the interface between the electrode active material and the solid electrolyte material is modified with a material having a high relative permittivity such as $BaTiO_3$, the large local electric field generated due to an electric potential difference between the electrode active material and the solid electrolyte material is attenuated. Therefore, the decrease in ion mobility in the carrier-deficient layer is suppressed, which is thought to result in a reduction of the interface resistance. In addition, it is thought that the higher the relative permittivity of the dielectric, the smoother the movements of ions at the interface can be. Therefore, by disposing at the interface between the electrode active material and the solid electrolyte material a modification material having a higher relative permittivity than the relative permittivity of the solid electrolyte material, sufficiently decreasing the interface resistance between the electrode active material and the solid electrolyte material is thought to be possible.

JP-A-2002-042862 describes that, sulfolane and sulfolane derivatives being solvents having high permittivity and excellent ion conductivity, the presence thereof in the vicinity of the contact point between particles of active material and oxidic inorganic solid electrolyte decreases the resistance to lithium ion conduction between the particles. However, there was no description regarding the magnitude relationship between the relative permittivity of sulfolane and the relative permittivity of the oxidic inorganic solid electrolyte ($Li_{1+x+y}Al_xTi_{2-x}Si_yP_{3-y}O_{12}$ ($0 \leq x \leq 0.4$; $0 \leq y \leq 0.6$)) used therein. According to investigations by the present inventors, the relative permittivity of sulfolane was lower than the relative permittivity of the oxidic inorganic solid electrolyte. Therefore, sufficiently reducing the interface resistance between the active material and the oxidic inorganic solid electrolyte is not thought to be possible. Hereafter, the secondary battery of the present embodiment will be described one configuration at a time.

First, the positive electrode active material layer in the present embodiment will be described. The positive electrode active material layer in the present embodiment is a layer containing at least a positive electrode active material, and as necessary may contain at least one of an electrolyte material, an electric conducting material and a binding material. In the present embodiment, the positive electrode active material layer preferably contains an electrolyte material. The reason is that the ion conductivity of the positive electrode active material layer can be improved. In addition, in the present embodiment, when the positive electrode active material layer contains both a positive electrode active material and an electrolyte material, a modification material having a higher relative permittivity than the relative permittivity of the electrolyte material is preferably disposed within the positive electrode active material layer. In this case, the modification material need not be disposed on the entire surface of the interface between the positive electrode active material and the electrolyte material, as being disposed on at least a portion of the interface between the positive electrode active material and the electrolyte material is adequate.

The positive electrode active material used in the present embodiment is different depending on the species of conduction ions in the target secondary battery. For instance, when the secondary battery of the present embodiment is a lithium secondary battery, the positive electrode active material stores and releases lithium ions.

As positive electrode active materials used in the present embodiment, with no particular limitation, for instance, oxide positive electrode active material can be cited. Using a oxide positive electrode active material allows the secondary battery to have high energy density. When the secondary battery of the present embodiment is a lithium secondary battery, as oxide positive electrode active material used, for instance, rock salt layer-type active materials such as $LiCoO_2$, $LiMnO_2$, $LiNiO_2$, $LiVO_2$ and $LiNi_{1/3}Co_{1/3}Mn_{1/3}O_2$, spinel-type active materials such as $LiMn_2O_4$, and $Li(Ni_{0.5}Mn_{1.5})O_4$, olivine-type active materials such as $LiFePO_4$ and $LiMnPO_4$, and the like, can be cited. In addition, an Si-containing oxide such as $Li_2FeSiO_4$ or $Li_2MnSiO_4$ may also be used as a positive electrode active material.

In addition, the positive electrode active material is preferably an oxide positive electrode active material containing Li, Ni and Mn (LNM). The reason is that, for instance, when LAGP is used, the interface resistance can be reduced sufficiently. As such oxide positive electrode active materials, for instance, $LiNi_xMn_{1-x}O_2$ ($0<x<1$, for instance, $LiNi_{0.5}Mn_{0.5}O_2$), $LiNi_xCo_yMn_zO_2$ ($x+y+z=1$, for instance, $LiNi_{1/3}Co_{1/3}Mn_{1/3}O_2$), $LiNi_xMn_{2-x}O_4$ ($0<x<2$, for instance, $LiNi_{0.5}Mn_{1.5}O_4$), $LiCr_xNi_yMn_zO_4$ ($x+y+z=2$, for instance, $LiCr_{0.05}Ni_{0.50}Mn_{1.45}O_4$), and the like, can be cited. In addition, as other examples, $Li_2MnO_3$—$LiNi_{1/3}Co_{1/3}Mn_{1/3}O_2$ solid solution, $Li_2MnO_3$—$LiNi_{0.5}Mn_{1.5}O_2$ solid solution, and the like, can be cited.

As shapes of the positive electrode active material, for instance, particle shapes can be cited, among which a spherical or ellipsoidal shape is desirable. In addition, when the positive electrode active material has a particle shape, the average particle size thereof is, for instance, preferably within the range of 0.1 μm to 50 μm. The average particle size can be defined by the $D_{50}$ measured with a particle size distribution meter. The average particle size can be defined similarly for each material described below. The positive electrode active material content in the positive electrode active material layer is, for instance, preferably within the range of 10% by weight to 99% by weight and more preferably within the range of 20% by weight to 90% by weight.

In the present embodiment, the positive electrode active material layer preferably contains an electrolyte material. The reason is that the ion conductivity of the positive electrode active material layer can be increased. The electrolyte material used in the present embodiment may be a solid electrolyte material, may be liquid electrolyte material, or may be a polymer electrolyte material, of which solid electrolyte material is desirable. The reason is that a solid electrolyte material does not contain a flammable organic solvent and thus allows the secondary battery to be highly safe.

As solid electrolyte materials used in the present embodiment, for instance, oxide solid electrolyte materials, sulfide solid electrolyte materials, and the like, can be cited. As oxide solid electrolyte materials, for instance, compounds having a Na super ionic conductor (NASICON)-type structure, and the like, can be cited. When the secondary battery of the present embodiment is a lithium secondary battery, the compound (LAGP) represented by the general formula $Li_{1+x}Al_xGe_{2-x}(PO_4)_3$ ($0 \leq x \leq 2$) can be cited as an example of compound having a NASICON-type structure. In the general formula, a range for x of 0 or greater is adequate, of which greater than 0 is desirable and 0.3 or greater is more desirable. Meanwhile, a range for x of 2 or lower is adequate, of which 1.7 or lower is desirable and 1 or lower is more desirable. Among these, in the present embodiment, the electrolyte material is preferably $Li_{1.5}Al_{0.5}Ge_{1.5}(PO_4)_3$. In addition, as other examples of compound having a NASICON-type structure, compounds (LAGP) represented by the general formula $Li_{1+x}Al_xTi_{2-x}(PO_4)_3$ ($0 \leq x \leq 2$) can be cited. In the general formula, a range for x of 0 or greater is adequate, of which greater than 0 is desirable and 0.3 or greater is more desirable. Meanwhile, a range for x of 2 or lower is adequate, of which 1.7 or lower is desirable and 1 or lower is more desirable. Among these, in the present embodiment, the electrolyte material is preferably $Li_{1.5}Al_{0.5}Ti_{1.5}(PO_4)_3$. In addition, as other examples of oxide solid electrolyte material, LiLaTiO (for instance, $Li_{0.34}La_{0.51}TiO_3$), LiPON (for instance, $Li_{2.9}PO_{3.3}N_{0.46}$), LiLaZrO (for instance, $Li_7La_3Zr_2O_{12}$), and the like, can be cited. Meanwhile, as sulfide solid electrolyte materials, for instance, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n represent positive numbers and Z represent any among Ge, Zn and Ga), $Li_2S$—$GeS_2$, $Li_2S$—$SiS_2$—$Li_3PO_4$, $Li_2S$—$SiS_2$—$Li_xMO_y$ (where x and y represent positive numbers and M represents any among P, Si, Ge, B, Al, Ga and In), and the like, can be cited. Note that the above notation "$Li_2S$—$P_2S_5$" means a sulfide solid electrolyte material obtained using a raw material composition containing $Li_2S$ and $P_2S_5$, and similarly for the other notations. More concretely, for instance, $Li_7P_3S_{11}$, $Li_{3.25}P_{0.95}S_4$, $Li_{3.25}Ge_{0.25}P_{0.75}S_4$, and the like, can be cited.

When the electrolyte material used in the present embodiment is a solid electrolyte material, as shapes of the solid electrolyte material, for instance, particle shapes can be cited, among which a spherical or ellipsoidal shape is desirable. In addition, when the solid electrolyte material has a particle shape, the average particle size thereof is, for instance, preferably within the range of 50 nm to 5 μm and more preferably within the range of 100 nm to 3 μm. The solid electrolyte material content in the positive electrode active material layer is, for instance, preferably within the range of 1% by weight to 90% by weight and more preferably within the range of 10% by weight to 80% by weight.

As liquid electrolyte materials used in the present embodiment, in general, non-aqueous electrolytic solution can be used. When the secondary battery of the present embodiment is a lithium secondary battery, the non-aqueous electrolytic solution used contains in general a lithium salt and non-aqueous solvent. As lithium salts, for instance, inorganic lithium salts such as $LiPF_6$, $LiBF_4$, $LiClO_4$ and $LiAsF_6$, organolithium salts such as $LiCF_3SO_3$, $LiN(CF_3SO_2)_2$, $LiN(C_2F_5SO_2)_2$ and $LiC(CF_3SO_2)_3$, and the like, can be cited. As non-aqueous solvents, for instance, ethylene carbonate (EC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof, and the like, can be cited. The lithium salt concentration in the non-aqueous electrolytic solution is, for instance, within the range of 0.5 mol/L to 3 mol/L. In the present embodiment, low-volatility liquids such as, for instance, ionic solutions, can be used as non-aqueous electrolytic solutions.

In the present embodiment, when the positive electrode active material layer contains both the positive electrode active material and the electrolyte material, the modification material having a higher relative permittivity than the relative permittivity of the electrolyte material is preferably disposed within the positive electrode active material layer. As the modification material has a higher relative permittivity than the relative permittivity of the electrolyte material, the conduction ions are prevented from building-up or generating polarization at the interface between the positive electrode active material and the electrolyte material during battery use, allowing the movements of conduction ions at the interface to be smooth.

The modification material used in the present embodiment has a higher relative permittivity than the relative permittivity of the electrolyte material. Either of the following two methods can be adopted. Although the values (absolute values) of the relative permittivity obtained sometimes differ between the two measurement methods, this is due to the measurement conditions being different, and the relative magnitude relationship between the relative permittivity of the electrolyte material and the relative permittivity of the modification material is the same using either method.

As a first method, for instance, the method of using the impedance analyzer 4194A manufactured by Yokogawa-Hewlett Packard to measure the relative permittivity of a sample can be cited. Concretely, a sample is introduced into an electrode cell, a voltage and a frequency are applied, the capacitance stored between the electrodes is measured, and the relative permittivity ($\in_r$) of the sample is measured according to Formula (1). In formula (1): $C_p$: capacitance of sample; $C_o$: capacitance of air.

$$\in_r = C_p/C_o \qquad (1)$$

As the second measurement method, for instance, a method described in JIS C 2565 (resonant cavity method, or the like), a method improved from the method described in JIS C 2565 as closed sample insertion hole-type (closed sample insertion hole-type resonant cavity perturbation method), and the like, can be cited. Concretely, a sample is inserted into the cavity resonator and the variation in the resonance frequency before and after sample insertion is measured, allowing the permittivity to be calculated.

In addition, the ratio (B/A) of the relative permittivity of the electrolyte material (B) with respect to the relative permittivity of the modification material (A) is not to be limited in particular as long as the effects of the present embodiment can be obtained, and is, for instance, preferably within the range of 0.001 to 1 and more preferably within the range of 0.005 to 0.5, and even more preferably within the range of 0.01 to 0.1.

The modification material in the present embodiment is not to be limited in particular as long as it has a higher relative permittivity than the relative permittivity of the electrolyte material, and is preferably a ferroelectric. The reason is that, if a ferroelectric is used for the modification material, even when no voltage is applied from an external circuit, the electric field at the interface can be attenuated using spontaneous polarization. In addition, as the relative permittivity of the modification material can be increased, the effect of suppressing the build-up and polarization of conduction ions at the interface for a smooth movement of conduction ions can be obtained not only in the vicinity of the modification material but also at locations that are apart from the modification material, the interface resistance can be decreased efficiently by disposing a small amount of modification material at the interface between the positive electrode active material and the electrolyte material. In addition, the modification material, for instance, may be a solid, may be a liquid and may be a gel, of which solid is desirable. The reason is that, since the fluidity of a solid is extremely low, the modification material, with no movement, can be disposed more definitely at the interface between the electrode active material and the electrolyte material. As solid modification materials, for instance, oxides, sulfides, nitrides, polymers, and the like, can be cited, of which oxides are desirable. The reason is that they are stable in the atmosphere. As concrete examples of oxide modification material, $BaTiO_3$, PZT (lead zirconate titanate), $AlPO_4$, Rochelle salt, $TiO_2$, $SiO_2$, MgO, $AlPO_4$, $Al_2O_3$, $Li_2B_4O_7$, $LiTaO_3$, $LiNbO_3$, $Li_3PO_4$, $LiAlSiO_4$, Li—P—Si—O, Li—B—Si—O and the like, can be cited, of which $BaTiO_3$, $Li_2B_4O_7$, $LiTaO_3$, $LiNbO_3$ are desirable. The reason is that the relative permittivity is high. In addition, as concrete examples of sulfide modification material, vanadium sulfide, magnesium sulfate, and the like, can be cited, and as concrete examples of nitride modification material, $Si_3N_4$, SiAlON, and the like, can be cited.

In the invention, a modification material is disposed at the interface between an electrode active material (for instance, a positive electrode active material) and an electrolyte material. The combination of modification material and electrolyte material is not limited in particular as long as the relative permittivity relationship described above is fulfilled, and any combination is adequate. As one example of preferred combination, the combination in which the modification material is at least one of $BaTiO_3$, $Li_2B_4O_7$, $LiTaO_3$ and $LiNbO_3$, and the electrolyte material is LAGP can be cited. In addition, combination of positive electrode active material and electrolyte material is not limited in particular, and any combination is adequate. As one example of preferred combination, the combination in which the positive electrode active material is LNM and the electrolyte material is LAGP can be cited.

The modification material content in the positive electrode active material layer is not to be limited in particular as long as the effects of the present embodiment can be exerted, and is preferably adjusted suitably according to the type, or the like, of the electrolyte material and modification material contained in the positive electrode active material layer. The weight ratio between the positive electrode active material and the modification material (positive electrode active material/modification material) in the positive electrode active material layer is preferably within the range of 100/0.1 to 100/3 and more preferably, positive electrode active material/modification material is within the range of 100/0.1 to 100/1. In addition, in the above circumstance, the weight ratio between the electrolyte material and the modification material (electrolyte material/modification material) in the positive electrode active material layer is preferably within the range of 30/0.1 to 30/3 and more preferably, electrolyte material/modification material is within the range of 30/0.1 to 30/1. The reason is that, if the weight ratio of the modification material is too few, there is a possibility that not much of the build-up of conduction ions at the interface between the positive electrode active material and the electrolyte material cannot be suppressed, which does not allow the effects of the present embodiment to be obtained sufficiently, and if the weight ratio of the modification material is excessive there is the possibility that the passage for the conduction ion disappear, causing the effects of the present embodiment to fade. In the case of a modification material having extremely high relative permittivity such as $BaTiO_3$, as described above, the effect of suppressing the build-up and polarization of conduction ions at the interface for a smooth movement of conduction ions can be obtained not only in the vicinity of the modification material but also at locations that are apart from the modification material, allowing the amount of modification material added to be a small amount.

In the present embodiment, the modification material and the electrolyte material are preferably supported on the surface of the positive electrode active material, forming a conjugated particle. The reason is that modification material can be readily and definitely disposed at the interface between the positive electrode active material and the electrolyte material. The weight ratio between the modification material and the electrolyte material supported on the surface of the positive electrode active material (modification material/electrolyte material) in the positive electrode active material layer, for instance, when the electrolyte material is the compound represented by the general formula $Li_{1+x}Al_xGe_{2-x}(PO_4)_3$ (0≤x≤2) and the modification material is $BaTiO_3$, is preferably within the range of 0.1/5 to 3/5 and more preferably modification material/electrolyte material is within the range of 0.1/5 to 1/5. The conjugated particle can be obtained by mixing the positive electrode active material, the modification material and the electrolyte material and carrying out conjugation treatment. As conjugation treatments, for instance, mechano-fusion, and the like, can be cited.

Figure 2A:
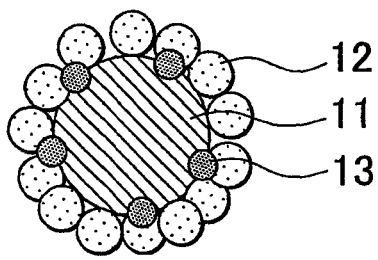
FIGS. 2A to 2C are simple cross-sectional views showing an example of modification material of the present embodiment.
Figure 2B:
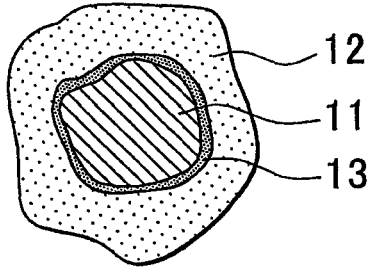
Figure 2C:
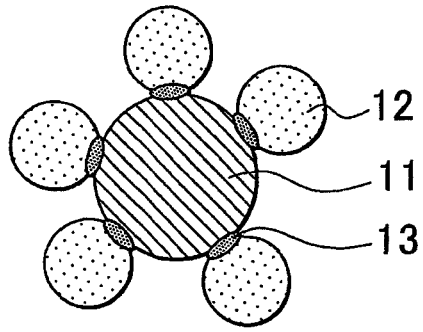

In the present embodiment, when the positive electrode active material layer contains an electrolyte material, the modification material having a higher relative permittivity than the relative permittivity of the electrolyte material is preferably disposed within the positive electrode active material layer. As morphologies of the modification material in this case, for instance, as shown in FIGS. 2A to 2C, a morphology in which the modification material 13 is disposed at the interface between the positive electrode active material 11 and the electrolyte material 12 as part of a conjugated particle obtained by conjugation treatment with the positive electrode active material 11 and the electrolyte material 12 (FIG. 2A), morphologies in which the modification material 13 is disposed at the interface between the positive electrode active material 11 and the electrolyte material 12 as a hetero-phase self-formed through a reaction between the positive electrode active material 11 and the electrolyte material 12 (for instance, firing, or the like, in the battery fabrication process) (FIGS. 2B and 2C), and the like, can be cited. In the case of FIG. 2B, although the modification material 13 is covering the entirety of the surface of the positive electrode active material 11, thinning the thickness of the modification material 13 allows the conduction ions to pass through the modification material 13. In order to secure a passage for the conduction ions, as in FIG. 2C, the positive electrode active material 11 and the electrolyte material 12 may be brought into partial contact, with the modification material 13 self-forming at the interface between the positive electrode active material 11 and the electrolyte material 12. Meanwhile, in the present embodiment, when the positive electrode active material layer does not contain the electrolyte material, the modification material having a higher relative permittivity than the relative permittivity of the electrolyte material is disposed in general within the positive electrode active material layer, within the electrolyte layer, or, at the interface between the positive electrode active material layer and the electrolyte layer. In the present embodiment, the modification material may be supported on the surface of the electrolyte material.

The positive electrode active material layer in the present embodiment may further contain an electric conducting material. The addition of an electric conducting material allows the electric conductivity of the positive electrode active material layer to be increased. As electric conducting materials, for instance, acetylene black, ketjen black, carbon fiber, and the like, can be cited. In addition, the positive electrode active material layer may further contain a binding material. As binding materials, for instance, fluorine-containing binding materials such as polyvinylidene fluoride (PVDF), polytetrafluoroethylene (PTFE), and the like, can be cited. While differing depending on the type of the target secondary battery, the thickness of the positive electrode active material layer is, for instance, preferably within the range of 0.1 μm to 1000 μm.

Next, the negative electrode active material layer in the present embodiment will be described. The negative electrode active material layer in the present embodiment is a layer containing at least a negative electrode active material, and as necessary may further contain at least one among an electrolyte material, an electric conducting material and a binding material. In the present embodiment, the negative electrode active material layer preferably contains an electrolyte material. The reason is that the ion conductivity of the negative electrode active material layer can be improved. In addition, in the present embodiment, when the negative electrode active material layer contains both a negative electrode active material and an electrolyte material, a modification material having a higher relative permittivity than the relative permittivity of the electrolyte material is preferably disposed within the negative electrode active material layer. In this case, the modification material need not be disposed on the entire surface of the interface between the negative electrode active material and the electrolyte material, as being disposed on at least a portion of the interface between the negative electrode active material and the electrolyte material is adequate.

As negative electrode active materials used in the present embodiment, for instance, metallic active materials and carbon active materials can be cited. As metallic active materials, for instance, In, Al, Si and Sn, and the like, can be cited. Meanwhile, as carbon active materials, for instance, mesocarbon microbeads (MCMB), highly ordered pyrolytic graphite (HOPG), hard carbon, soft carbon, and the like, can be cited. The negative electrode active material content in the negative electrode active material layer is, for instance, preferably within the range of 10% by weight to 99% by weight and more preferably within the range of 20% by weight to 90% by weight.

In the present embodiment, the negative electrode active material layer preferably contains an electrolyte material. The reason is that the ion conductivity of the negative electrode active material layer can be increased. Description regarding the electrolyte material will be omitted here, as the contents are the same as those described in the explanation of the positive electrode active material layer. When the electrolyte material used in the present embodiment is a solid electrolyte material, the solid electrolyte material content in the negative electrode active material layer is, for instance, preferably within the range of 1% by mass to 90% by mass and more preferably within the range of 10% by mass to 80% by mass.

In the present embodiment, when the negative electrode active material layer contains both the negative electrode active material and the electrolyte material, the modification material having a higher relative permittivity than the relative permittivity of the electrolyte material is preferably disposed within the negative electrode active material layer. As the modification material has a higher relative permittivity than the relative permittivity of the electrolyte material, the conduction ions are prevented from building-up or generating polarization at the interface between the negative electrode active material and the electrolyte material during battery use, allowing the movements of conduction ions at the interface to be smooth. Description regarding the modification materials used in the negative electrode active material layer will be omitted here, as the contents are the same as those described in the explanation of the positive electrode active material layer.

Regarding the electric conducting materials and the binding materials used in the negative electrode active material layer, they are the same as those in the case of the positive electrode active material layer. In addition, while differing depending on the type of the target secondary battery, the thickness of the negative electrode active material layer is, for instance, preferably within the range of 0.1 μm to 1000 μm.

Next, the electrolyte layer in the present embodiment will be described. The electrolyte layer in the present embodiment is a layer formed between the positive electrode active material layer and the negative electrode active material layer and containing at least an electrolyte material. Ion conduction is carried out between the positive electrode active material and the negative electrode active material, mediated by the electrolyte material contained in the electrolyte layer. The morphology of the electrolyte layer is not limited in particular, liquid electrolyte layer, gel electrolyte layer, polymer electrolyte layer, solid electrolyte layer, and the like, can be cited, of which, solid electrolyte layer is desirable. The reason is that this allows the secondary battery to have excellent safety.

While the solid electrolyte layer is preferably configured by the solid electrolyte material alone, the solid electrolyte material may be contained as a main phase and the modification material may be contained as a subphase. The modification material content in the electrolyte layer is, for instance, 0.01% by weight to 10% by weight and more preferably within the range of 0.1% by weight to 5% by weight. Descriptions regarding the solid electrolyte materials and the modification materials used in the solid electrolyte layer will be omitted here, as the contents are the same as those described in the explanation of the positive electrode active material layer. In addition, the solid electrolyte layer may further contain a binding material, as necessary. Description regarding the binding materials used in the solid electrolyte layer is the same as in the case of the positive electrode active material layer described above.

While differing significantly depending on the species of the electrolyte material and the configuration of the secondary battery, the thickness of the electrolyte layer is, for instance, within the range of 0.1 μm to 1000 μm, of which within the range of 0.1 μm to 300 μm is desirable.

The secondary battery of the present embodiment has at least the positive electrode active material layer, the negative electrode active material layer and the electrolyte layer, which were described above. In general, it further has a positive electrode collector carrying out current collection for the positive electrode active material layer and a negative electrode collector carrying out current collection for the negative electrode active material layer. As materials for the positive electrode collector, for instance, SUS, aluminum, nickel, iron, titanium, carbon, and the like, can be cited, of which, SUS is desirable. Meanwhile, as materials for the negative electrode collector, for instance, SUS, copper, nickel, carbon, and the like, can be cited, of which, SUS is desirable. In addition, regarding the thicknesses, the shapes and the like, of the positive electrode collector and the negative electrode collector, they are preferably selected suitably according to the application, or the like, of the secondary battery. In addition, a battery case for a generic secondary battery can be used for the battery case used in the present embodiment. As battery cases, for instance, SUS battery cases, and the like, can be cited.

The secondary battery of the present embodiment may have a separator between the positive electrode active material layer and the negative electrode active material layer. The reason is that this allows a secondary battery having higher safety to be obtained. As materials for the separator, for instance, porous membranes such as polyethylene, polypropylene, cellulose and polyvinylidene fluoride, and nonwoven fabrics such as resin nonwoven fabrics and glass fiber nonwoven fabrics, and the like, can be cited.

As types of the secondary battery of the present embodiment, lithium secondary batteries, sodium secondary batteries, magnesium secondary batteries and calcium secondary batteries, and the like, can be cited, of which lithium secondary batteries and sodium secondary batteries are desirable, and, in particular, lithium secondary batteries are desirable. In addition, the secondary battery of the present embodiment is used preferably, for instance, as on-board car battery. As shapes for the secondary battery of the present embodiment, for instance, coin type, laminate type, cylinder type, square type, and the like, can be cited. In addition, fabrication methods for the secondary battery of the present embodiment are not limited in particular as long as the methods allow the secondary battery described above to be obtained, and methods that are similar to fabrication methods for generic secondary batteries can be used. When the secondary battery of the present embodiment is an all-solid-state secondary battery, for instance, the method of pressing the material configuring the positive electrode active material layer, the material configuring the electrolyte layer (solid electrolyte layer) and the material configuring the negative electrode active material layer one after the other to fabricate a power generation element, housing the power generation element inside the battery case, and swaging the battery case, or the like, can be cited.

The invention is not limited to the embodiment. The above embodiment is illustrative, and any embodiment having a substantially identical configuration to the technical ideas described in the claims of the invention and accomplishing similar effects is included in the technical scope of the invention.

Hereafter, the invention will be described more concretely by showing examples.

EXAMPLE 1

Preparation of conjugated particle will be described. The positive electrode active material $LiCoO_2$ (manufactured by Nichia Corporation; $D_{50}=10$ μm), the modification material $BaTiO_3$ (manufactured by KCM Corporation; $D_{50}=50$ nm) and the electrolyte material $Li_{1.5}Al_{0.5}Ge_{1.5}(PO_4)_3$ (manufactured by Hosokawa Micron Corporation; $D_{50}=100$ nm, LAGP) were weighed so as to have a weight ratio of $LiCoO_2$:$BaTiO_3$:LAGP=100:0.1:5, and a conjugation treatment was carried out using the mechanofusion device AMS-MINI manufactured by Hosokawa Micron Corporation. Conjugated particles were obtained in this way, with $BaTiO_3$ disposed at the $LiCoO_2$/LAGP interface.

Next, the fabrication of an evaluation battery will be described. First, the conjugated particles obtained by the above method and LAGP were weighed so as to have the weight ratio of $LiCoO_2$:LAGP=100:30 and mixed with a mortar to obtain a positive electrode composite. The mixing ratio of the obtained positive electrode composite was $LiCoO_2$/$BaTiO_3$/LAGP=100/0.1/30. Next, a layered body of 7.8 mg of the positive electrode composite and 300 mg of LAGP was prepared, and in addition, a 140 μm-thick polymer electrolyte layer was layered on the LAGP side to obtain a layered body of positive electrode active material layer/electrolyte layer. The diameter of the layered body was ϕ12.5 mm. Note that if LAGP and Li metal come in direct contact, a reaction phase is formed at the interface, which raises the resistance; thus, here, a polymer electrolyte layer is sandwiched conveniently. Carrying on, Li metal was adhered to the layered body of positive electrode active material layer/electrolyte layer, which thereafter was enclosed in a 2032-type coin battery to prepare an evaluation battery.

EVALUATION 1

Figure 3:
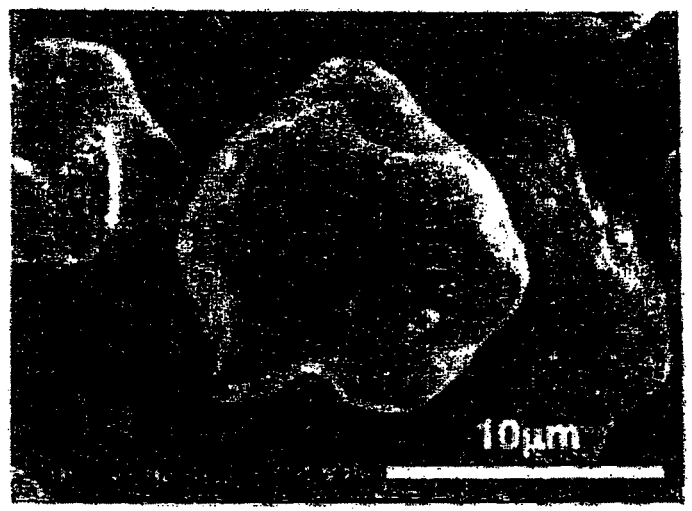
FIG. 3 is a transmission electron microscope (TEM) photograph of an $LiCoO_2$ particle used in Example 1.

(TEM observation of $LiCoO_2$ particle and conjugated particle) A $LiCoO_2$ particle used in Example 1 and a conjugated particle obtained in Example 1 were observed by transmission electron microscopy (TEM). The obtained TEM photographs are shown in FIG. 3 to FIG. 4B respectively. FIG. 4B is a magnified view of FIG. 4A, the portions seen in white represent $BaTiO_3$. By comparison of FIGS. 3 to 4B, it was verified that a conjugated particle in which LAGP and $BaTiO_3$ were supported on the surface of $LiCoO_2$ was obtained by the conjugation treatment.

Next, the relative permittivity measurement will be described. The relative permittivities of $BaTiO_3$ and LAGP were measured using the impedance analyzer 4194A manufactured by Yokogawa-Hewlett Packard. As a result, the relative permittivity of $BaTiO_3$ was 1069 and the relative permittivity of LAGP was 86.

EXAMPLE 2

An evaluation battery was fabricated in a similar manner to Example 1, except that, in the preparation of conjugated particles, the weight ratio among the positive electrode active material, the modification material and the electrolyte material was $LiCoO_2$:$BaTiO_3$:LAGP=100:0.5:5. The mixing ratio of the positive electrode composite was $LiCoO_2$/$BaTiO_3$/LAGP=100/0.5/30.

EXAMPLE 3

An evaluation battery was fabricated in a similar manner to Example 1, except that, in the preparation of conjugated particles, the weight ratio among the positive electrode active material, the modification material and the electrolyte material was $LiCoO_2$:$BaTiO_3$:LAGP=100:1:5. The mixing ratio of the positive electrode composite was $LiCoO_2$/$BaTiO_3$/LAGP=100/1/30.

EXAMPLE 4

An evaluation battery was fabricated in a similar manner to Example 1, except that, in the preparation of conjugated particles, the weight ratio among the positive electrode active material, the modification material and the electrolyte material was $LiCoO_2$:$BaTiO_3$:LAGP=100:3:5. The mixing ratio of the positive electrode composite was $LiCoO_2$/$BaTiO_3$/LAGP=100/3/30.

COMPARATIVE EXAMPLE 1

An evaluation battery was fabricated in a similar manner to Example 1, except that no conjugated particle was used and the mixing ratio of the positive electrode composite was $LiCoO_2$/LAGP=100/30.

EVALUATION 2

Figure 5:
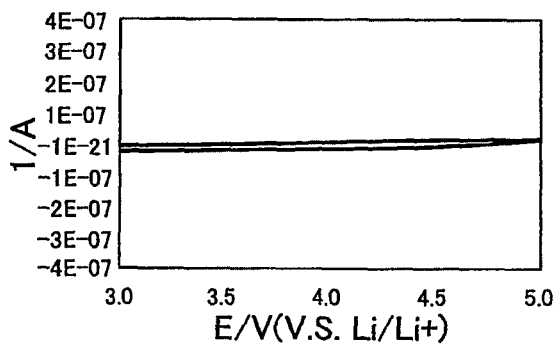
FIG. 5 is a set of graphs showing the results of cyclic voltammetry measurements for the evaluation batteries obtained in Examples 1 to 4 and Comparative Example 1.
Figure 5:
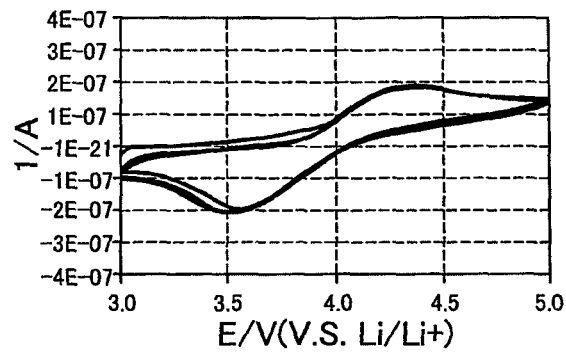
Figure 5:
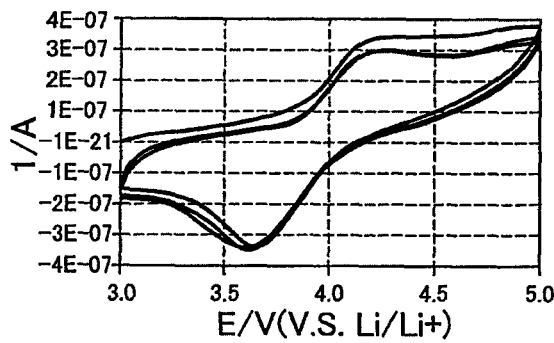
Figure 5:
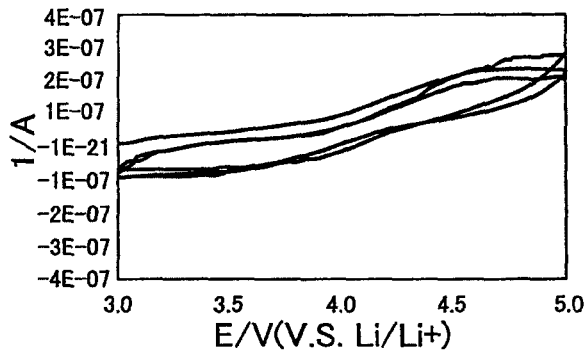
Figure 5:
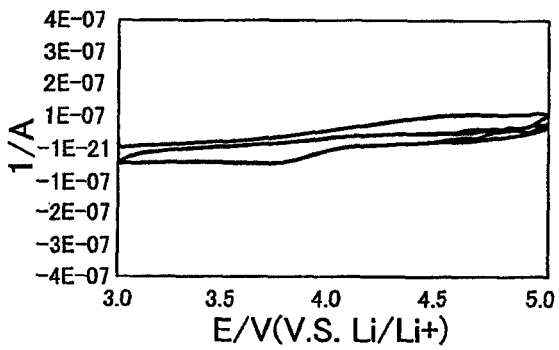

The evaluation batteries obtained in Examples 1 to 4 and Comparative Example 1 were used to evaluate their electrochemical characteristics. Concretely, 3-cycle cyclic voltammetry measurements were carried out with a sweep rate of 1 mV/sec and a voltage range of 3V to 5V, to evaluate the peak current value of the oxidation current. The results of the cyclic voltammetry measurements are shown in FIG. 5 and the obtained peak current values are shown in Table 1. In addition, a graph plotting the peak current values against the amount of $BaTiO_3$ added is shown in FIG. 6.

|  | Positive electrode active material weight ratio $LiCoO_2/BaTiO_3/LAGP$ | Peak current value |
|---|---|---|
| Comparative Example 1 | 100/0/30 | 0.02 μA |
| Example 1 | 100/0.1/30 | 0.19 μA |
| Example 2 | 100/0.5/30 | 0.31 μA |
| Example 3 | 100/1/30 | 0.22 μA |
| Example 4 | 100/3/30 | 0.10 μA |

Figure 6:
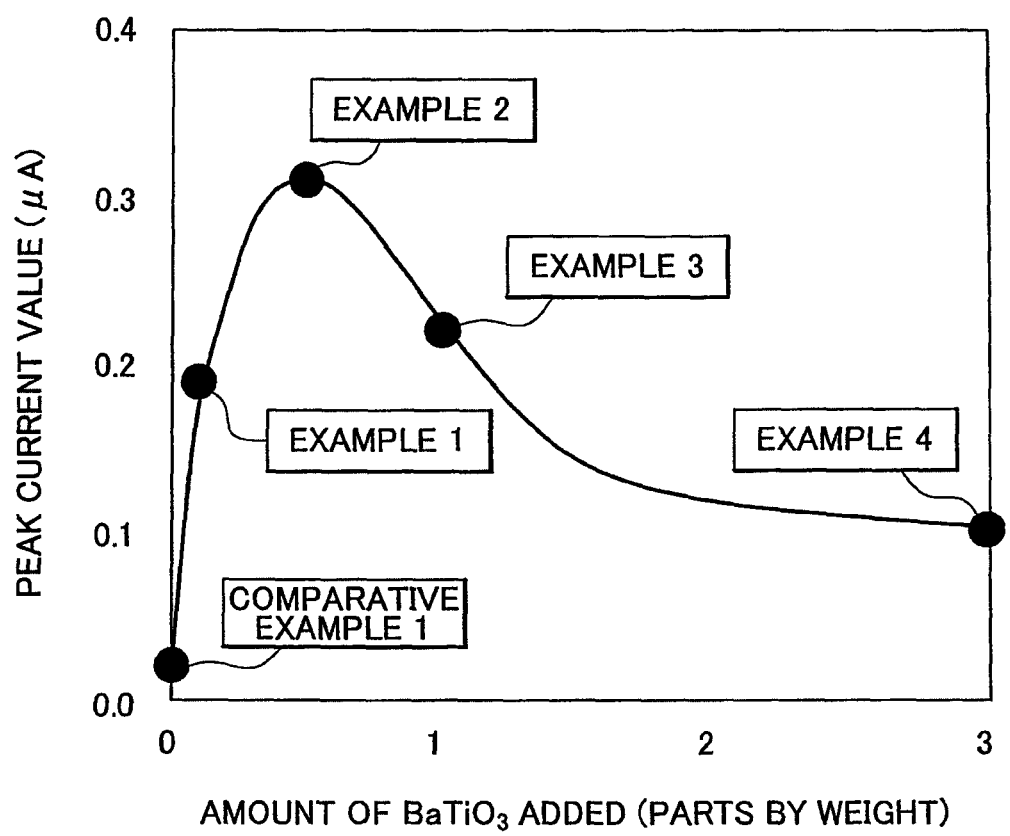
FIG. 6 is a graph showing the relationship between peak current value and $BaTiO_3$ addition quantity for the evaluation batteries obtained in Examples 1 to 4 and Comparative Example 1.

As shown in FIG. 5, FIG. 6 and Table 1, it was observed that, in comparison to the evaluation battery obtained in Comparative Example 1, the evaluation batteries obtained in Examples 1 to 4 could obtain high peak current values and could obtain high capacity even when charged-discharging at a high rate. The reason for this is thought to be that the interface resistance between $LiCoO_2$ and LAGP could be reduced by disposing $BaTiO_3$ at the interface between $LiCoO_2$ and LAGP. In particular, the evaluation batteries obtained in Examples 1 to 3 demonstrate high peak current values and the effects of reducing the interface resistance was observed to be remarkable when the weight ratio of $LiCoO_2$/$BaTiO_3$ was within the range of 100/0.1 to 100/1. The reason for this is thought to be that if the weight ratio of $LiCoO_2$:$BaTiO_3$ is smaller than 100:0.1, the amount of $BaTiO_3$ added is insufficient, while if the weight ratio of $LiCoO_2$:$BaTiO_3$ is greater than 100:1, the influence from $BaTiO_3$ inhibiting the movements of Li ions and electrons at the interface becomes large.

EXAMPLE 5

Figure 7:
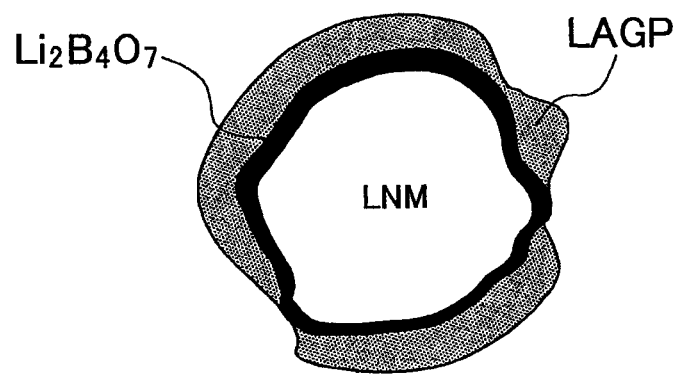
FIG. 7 is a simple cross-sectional view for describing the conjugated particle B obtained in Example 7.

Preparation of conjugated particle will be described. The positive electrode active material $LiNi_{0.5}Mn_{1.5}O_4$ (manufactured by Nichia Corporation; $D_{50}$=4.5 μm; LNM) and the modification material $Li_2B_4O_7$ (manufactured by Hosokawa Micron Corporation; $D_{50}$=200 nm) were weighed so as to have a weight ratio of LNM:$Li_2B_4O_7$=100:5, and a conjugation treatment was carried out using the conjugation treatment apparatus (Nobilta) manufactured by Hosokawa Micron Corporation. Conjugated particles A were obtained in this way, with $Li_2B_4O_7$ supported on the surface of LNM. Next, the obtained conjugated particles A and the electrolyte material $Li_{1.5}Al_{0.5}Ge_{1.5}(PO_4)_3$ (manufactured by Hosokawa Micron Corporation; $D_{50}$=100 nm; LAGP) were weighed so as to have a weight ratio of conjugated particles A:LAGP=105:5, and a conjugation treatment was carried out using the conjugation treatment apparatus (Nobilta) manufactured by Hosokawa Micron Corporation. Conjugated particles B were obtained in this way, with LAGP supported on the surface of conjugated particles A. The conjugated particle B, as shown in FIG. 7, is a particle with $Li_2B_4O_7$ disposed at the LNM/LAGP interface.

Next, the fabrication of an evaluation battery will be described. First, the conjugated particles B obtained by the above method and LAGP were weighed so as to have the weight ratio of conjugated particles B:LAGP=60:40, and mixed with a mortar to obtain a positive electrode composite. Next, a layered body having a positive electrode active material layer comprising 0.010 g of the positive electrode composite and a solid electrolyte layer comprising 0.3 g of LAGP was formed using a uniaxial press jig (φ13 mm). Isostatic pressing was carried out at a pressure of 200 MPa on this layered body. Thereafter, a first firing was carried out with the conditions of 540° C., 2 hours and ambient atmosphere, and next, a second firing was carried out at condition of 600° C., 2 hours and ambient atmosphere. A sintered body was obtained in this way, constituted from a positive electrode active material layer and a solid electrolyte layer. In metal was disposed on the surface of this sintered body, on the solid electrolyte layer side, to fabricate a power generation element, this power generation element was enclosed in a 2032-type coin battery. An evaluation battery was obtained in this way.

EXAMPLE 6

An evaluation battery was obtained in a similar manner to Example 5, except that $LiTaO_3$ was used as the modification material.

EXAMPLE 7

An evaluation battery was obtained in a similar manner to Example 5, except that $LiNbO_3$ was used as the modification material.

COMPARATIVE EXAMPLE 2

An evaluation battery was obtained in a similar manner to Example 5, except that no modification material was used.

EVALUATION 3

Figure 8A:
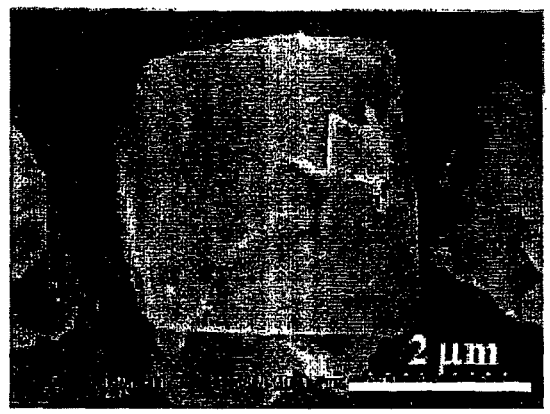
FIGS. 8A, 8B and 8C are scanning electron micrograph (SEM) photographs of the LNM particles used in Example 7 and the conjugated particles A and B obtained in Example 7.
Figure 8B:
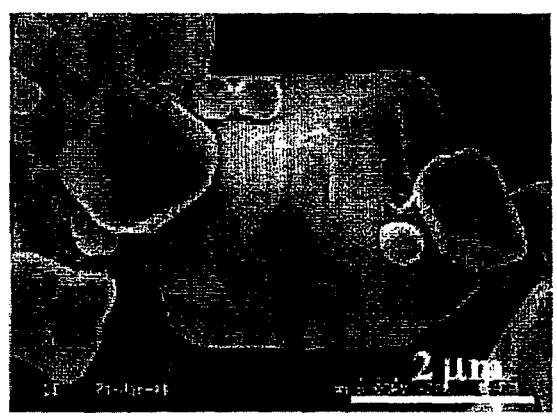
Figure 8C:

A LNM particle used in Example 7 and conjugated particles A and B obtained in Example 7 were observed with a SEM. The obtained SEM photographs are shown in FIGS. 8A to 8C, respectively. By comparing FIGS. 8A to 8C respectively, it was verified that $LiNbO_3$ was disposed at the LNM/LAGP interface by the conjugation treatment.

Relative permittivity at 1 GHz was measured for $Li_2B_4O_7$, $LiTaO_3$, $LiNbO_3$ and LAGP used in Examples 5 to 7. Concretely, 0.3638 g of powder with a particle size of 10 nm was used to carry out measurements based on a measurement method improved from the method described in JIS C 2565 into the hole occlusion form. The results are shown in Table 2. As shown in Table 2, it was verified that $Li_2B_4O_7$, $LiTaO_3$ and $LiNbO_3$ all had a higher relative permittivity than LAGP.

The evaluation batteries obtained in Examples 5 to 7 and Comparative Example 2 were used to measure the interface resistance of LNM and LAGP. First, 3-cycle cyclic voltammetry measurements were carried out on the evaluation batteries, with the conditions: scan rate: 0.1 mV/sec; and voltage range: 2.5 V to 4.8 V (with a Li reference, corresponds to 3.1 V to 5.4 V (vs. Li/Li$^+$)). Next, the electric potential was adjusted to 4.7 V (vs. Li/Li$^+$), alternating current impedance measurement was carried out to measure the interface resistance of LNM and LAGP with the conditions: alternating current amplitude: 100 mV; and frequency range: 1 MHz to 10 MHz. The results are shown in Table 2.

TABLE 2

|  | Modification material | | LNM/LAGP |
|---|---|---|---|
|  | Material | Relative permittivity | interface resistance |
| Example 5 | $Li_2B_4O_7$ | 140 | $3.9 \times 10^5$ Ω |
| Example 6 | $LiTaO_3$ | 2808 | $4.5 \times 10^5$ Ω |

TABLE 2-continued

|  | Modification material | | LNM/LAGP |
|---|---|---|---|
|  | Material | Relative permittivity | interface resistance |
| Example 7 | LiNbO$_3$ | 1188 | 7.1 × 10$^5$ Ω |
| Comparative Example 2 |  | — | 1.6 × 10$^6$ Ω |

(LAGP relative permittivity is 13.)

As shown in Table 2, it was verified that using a material having a larger relative permittivity than the electrolyte material (LAGP) reduces the interface resistance of LNM and LAGP by one digit. The following point may be cited as an advantage in terms of electric potential due to the reduction of the interface resistance. Generally, since the energy density decreases when a battery discharges, caused by a voltage drop due to IR loss, reducing the internal resistance of the battery as much as possible to reduce the width of voltage drop is desirable. If the interface resistance can be reduced to 1/10, there is the advantage that the width of voltage drop due to IR loss can be reduced maximally to 1/10. In addition, the following point may be cited as a capacity advantage due to a reduction of the interface resistance. Generally, although when the charge-discharge rate is sufficiently small, the theoretical capacity can be obtained without depending on the size of the interface resistance, when the charge-discharge rate is large, a smaller interface resistance has the advantage of obtaining a large capacity.

The average operating voltages of the conjugated particles B obtained in Example 5 to 7 and Comparative Example 1 were determined by cyclic voltammetry. The results are shown in Table 3.

TABLE 3

|  | Modification material | Average operating voltage |
|---|---|---|
| Example 5 | Li$_2$B$_4$O$_7$ | 4.7 V (vs. Li/Li$^+$) |
| Example 6 | LiTaO$_3$ | 4.7 V (vs. Li/Li$^+$) |
| Example 7 | LiNbO$_3$ | 4.2 V (vs. Li/Li$^+$) |
| Comparative Example 2 | No material | 4.0 V (vs. Li/Li$^+$) |

As shown in Table 3, the average operating electric potential was maintained high for the conjugated particles B of Example 5 to 7, compared to Comparative Example 2. Here, if LNM and LAGP are sintered at 600° C. in a state where no modification material is present as in Comparative Example 2, reactivity is though to arise for LiMn$_2$O$_4$, LiMnPO$_4$ and the like, resulting in a lower voltage than the theoretical operating voltage of LNM of 4.7V (vs. Li/Li$^+$). Meanwhile, if a modification material is present as in Examples 5 to 7, the reaction of LNM and LAGP can be suppressed, which is thought to have allowed a reduction of the average operating electric potential of LNM to be suppressed. This effect was also suggested to be more prominent for Li$_2$B$_4$O$_7$ and LiTaO$_3$ than for LiNbO$_3$.

The invention claimed is:

1. A secondary battery comprising:
a positive electrode active material layer containing a positive electrode active material;
a negative electrode active material layer containing a negative electrode active material;
an electrolyte layer formed between the positive electrode active material layer and the negative electrode active material layer; and
a modification material disposed at an interface between an electrolyte material and the positive electrode active material, and having a higher relative permittivity than the relative permittivity of the electrolyte material, wherein:
the positive electrode active material is an oxide positive electrode active material containing Li, Ni, and Mn,
the electrolyte material is an oxide solid electrolyte material having a Na super ionic conductor-type structure,
the modification material is at least one of BaTiO$_3$, Li$_2$B$_4$O$_7$, LiTaO$_3$, and LiNbO$_3$, and
a weight ratio of the positive electrode active material to the modification material in the positive electrode active material layer is within a range of 100/0.1 to 100/5.

2. The secondary battery according to claim 1, wherein the modification material is a solid.

3. The secondary battery according to claim 1, wherein the modification material is BaTiO$_3$.

4. The secondary battery according to claim 1, wherein the modification material is at least one of Li$_2$B$_4$O$_7$, LiTaO$_3$ and LiNbO$_3$.

5. The secondary battery according to claim 1, wherein the electrolyte material is a compound represented by a general formula Li$_{1+x}$Al$_x$Ge$_{2-x}$(PO$_4$)$_3$, with x satisfying 0≤x≤2.

6. The secondary battery according to claim 1, wherein the weight ratio of the positive electrode active material to the modification material in the positive electrode active material layer is within a range of 100/0.1 to 100/3.

7. The secondary battery according to claim 6, wherein the weight ratio of the positive electrode active material to the modification material in the positive electrode active material layer is within a range of 100/0.1 to 100/1.

8. The secondary battery according to claim 1, wherein the modification material and the electrolyte material are supported on a surface of the positive electrode active material.

9. The secondary battery according to claim 8, wherein a weight ratio of the modification material to the electrolyte material supported on the surface of the positive electrode active material is within a range of 0.1/5 to 3/5.

10. The secondary battery according to claim 9, wherein the weight ratio of the modification material to the electrolyte material supported on the surface of the positive electrode active material is within a range of 0.1/5 to 1/5.

11. The secondary battery according to claim 8, wherein a weight ratio of the modification material to the electrolyte material supported on the surface of the positive electrode active material is within a range of 0.1/5 to 5/5.

12. The secondary battery according to claim 1, wherein the modification material and the electrolyte material form a conjugated particle in contact with the positive electrode active material.

13. The secondary battery according to claim 1, wherein the modification material and the positive electrode active material form a conjugated particle in contact with the electrolyte material.

14. The secondary battery according to claim 8, wherein the modification material, the electrolyte material, and the positive electrode material form a conjugated particle.

* * * * *